United States Patent [19]

Kobayashi

[11] Patent Number: 5,567,878
[45] Date of Patent: Oct. 22, 1996

[54] SEMICONDUCTOR ACCELERATION SENSOR

[75] Inventor: Eiji Kobayashi, Itami, Japan

[73] Assignee: Mitsubishi Denki Kabushiki Kaisha, Tokyo, Japan

[21] Appl. No.: 441,195

[22] Filed: May 15, 1995

[30] Foreign Application Priority Data

Aug. 4, 1994 [JP] Japan ................................. 6-183707

[51] Int. Cl.$^6$ ................................................. G01P 15/08
[52] U.S. Cl. ...................... 73/514.12; 73/522; 73/514.14
[58] Field of Search ...................... 338/2, 5, 43; 73/493,
73/497, 514.01, 514.06, 514.12, 514.33,
514.36, 514.37, 514.38, 514.08, 522, 526,
707, 514.32, 514.14

[56] References Cited

U.S. PATENT DOCUMENTS 4,922,753  5/1990  Idogaki ................................. 73/514.08
4,967,597  11/1990  Yamada ................................. 73/514.12

*Primary Examiner*—Hezron E. Williams
*Assistant Examiner*—Christine K. Oda
*Attorney, Agent, or Firm*—Leydig, Voit & Mayer

[57] ABSTRACT

A cantilever semiconductor acceleration sensor element is supported by a pedestal fixed to a base. The base is sealed with a cap, forming an airtight space between the cap and the base that is filled with silicone oil. A central portion of the cap is deformed by an external force to increase the pressure of the silicone oil in the space to a pressure above atmospheric pressure. The generation of air bubbles on the sensor element, even at low temperature, is avoided because of the high pressure of the silicone oil.

5 Claims, 3 Drawing Sheets

SEMICONDUCTOR ACCELERATION SENSOR

BACKGROUND OF THE INVENTION

1. Field of the Invention

The present invention relates to semiconductor acceleration sensors and their production method. More specifically, the present invention relates to semiconductor acceleration sensors to be applied to automobiles and the like and their production.

2. Description of Prior Art

FIG. 7 shows a lateral cross section of a conventional semiconductor acceleration sensor, where a semiconductor acceleration sensor element 4 includes an acceleration detection beam with a thin portion and a gauge resistance (not illustrated) arranged in the form of a bridge circuit. The beam is fixed to a base 1 with a pedestal 3 to make it a cantilever. The gauge resistance is electrically connected to an external terminal 2 with a thin metallic wire 5. The semiconductor acceleration sensor element 4 and other elements described are covered with a cap 7, and are attached to the base 1 by welding.

The space between the base 1 and the cap 7 is filled with oil, for example, silicone oil 9. The silicone oil 9 is a damping fluid that prevents possible damage of the semiconductor acceleration sensor element 4 owing to strong vibration and false responses due to extraneous vibrations. When the acceleration of an automobile is detected by a conventional semiconductor acceleration sensor, the ambient temperature will range from −40° C. to +120° C. Therefore a sponge is arranged within the package as a pressure cushioning material to prevent possible damage due to expansion or contraction of the silicone oil 9 as a damping fluid. In the figure, a sponge 6 is fixed onto the top of the cap 7 with an adhesive 8.

When accelerated, the semiconductor acceleration sensor element 4 deflects and stress is concentrated on its thin portion. This stress is converted into an electrical signal by a bridge circuit formed by the gauge resistors and detected as acceleration.

The semiconductor acceleration sensor is used in a wide temperature range as described above. Leaving a semiconductor acceleration sensor in a severe service temperature, especially at a low temperature, will cause air bubbles to form in the silicone oil 9. The difference between the coefficient of thermal expansion of the base 1 and said cap 8, and that of said silicone oil 9 will cause the silicone oil 9 to contract at a low temperature, and part of the inside of the package will become vacuum, generating air bubbles in the silicone oil 9.

In the conventional semiconductor acceleration sensor mentioned above, air bubbles generated from the silicone oil 9 may adhere to the semiconductor acceleration sensor element 4, resulting in non-linearities in the characteristics of the semiconductor acceleration sensor and possible generation of false signals.

SUMMARY OF THE INVENTION

To avoid these possible problems in the prior art, the object of the present invention is to provide a low-cost and high-precision semiconductor acceleration sensor that prevents the generation of air bubbles in the package and a method of producing the sensor.

According to a first aspect of the present invention, there is provided a semiconductor acceleration sensor comprising: a semiconductor acceleration sensor element having a thin portion with a gauge resistance thereon; a pedestal supporting one end of the semiconductor acceleration sensor element; a base supporting the pedestal; a cap covering the semiconductor acceleration sensor element and the pedestal oil filling a space between the base and the cap at a higher pressure than ordinary pressure; and a pressure cushioning material located within the space.

According to a second aspect of the present invention, there is provided a method for producing a semiconductor acceleration sensor comprising: a semiconductor acceleration sensor element having a thin portion with a gauge resistance thereon; a pedestal supporting one end of the semiconductor acceleration sensor element as a cantilever; a base supporting the pedestal; a cap covering the semiconductor acceleration sensor element and the pedestal oil filling space between the base and the cap at a higher pressure than ordinary pressure; a pressure cushioning material located within the space, including introducing the oil into the space between the base and the cap via a through hole in the base at a pressure higher than ordinary pressure, and sealing the through hole.

Other objects and advantages of the present invention will become apparent from the detailed description to follow taken in conjunction with the appended claims.

BRIEF DESCRIPTION OF THE DRAWINGS

In the accompanying drawings, there are shown illustrative embodiments of the invention from which these and other of its objectives, novel features, and advantages will be readily apparent.

DESCRIPTION OF THE PREFERRED EMBODIMENTS

Embodiment 1

Figure 1:
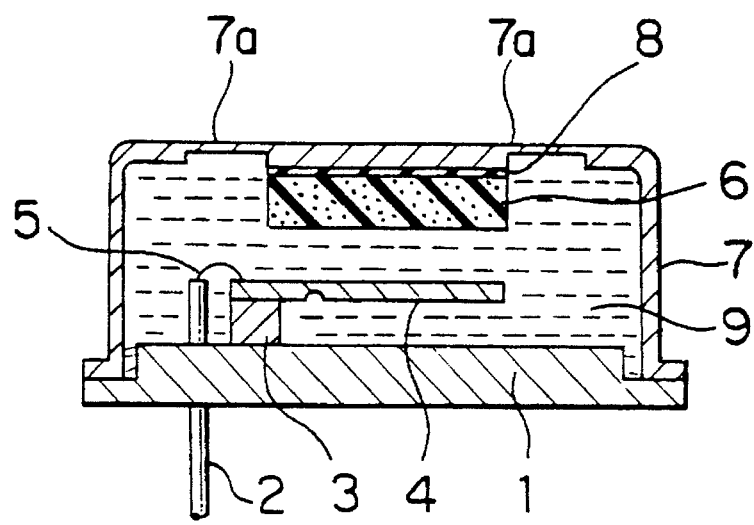
FIG. 1 shows a lateral cross section of a semiconductor acceleration sensor in accordance with a preferred embodiment of the present invention.
Figure 2:
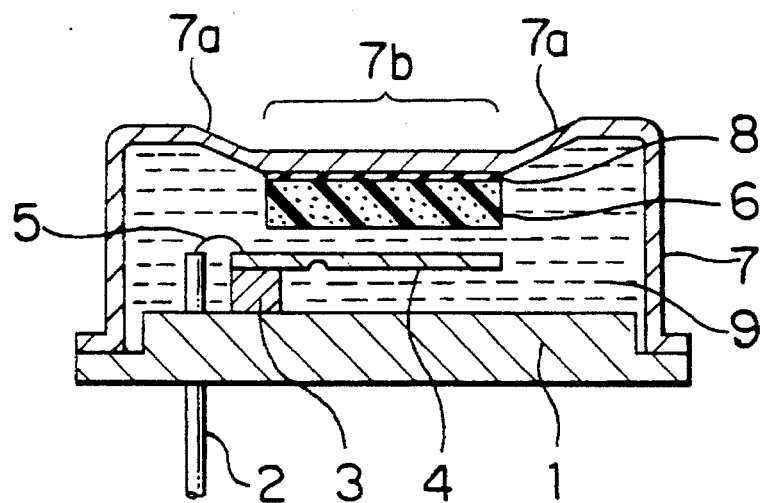
FIG. 2 is a lateral cross section showing the semiconductor acceleration sensor of FIG. 1 with the center of its cap deformed.

FIG. 1 shows a lateral cross section of a semiconductor acceleration sensor in accordance with a first embodiment of the present invention, while FIG. 2 is a lateral cross section showing the semiconductor acceleration sensor in FIG. 1 with the center of its cap deformed by external force. In the respective figures, identical numbers represent the same or equivalent parts. In FIG. 1, arranged at the top of the cap 7 is a thin annular part 7a to help deform the cap 7 easily.

In the semiconductor acceleration sensor configured as mentioned above, when an external force is applied to the center 7b of the cap 7, the central portion within the thinner annular part 7a of the cap is dented (FIG. 2). In this manner, the package volume is reduced, and thereby the silicone oil 9 pressure is increased above the normal pressure, for example, to 1.2 or 1.3 times atmospheric pressure. Therefore, when the semiconductor acceleration sensor is employed at a severe temperature, for example, even when it is left at a low temperature, the inside of the package is unlikely to form a vacuum so that generation of air bubbles is prevented. Accordingly, air babbles will not adhere to the semiconductor acceleration sensor element 4 and the characteristics will no become non-linear, whereby a low-cost and yet high-precision semiconductor acceleration sensor is realized.

By the way, in FIG. 1, the thinner annular part 7a is arranged at the top of the cap 7 for easier deformation, but that part may be arranged on the side of the cap. Further, the thinner annular part may not be present at all, and more than one such part may be present. In any case, an effect similar to the above is attained upon deformation of the thinner part or parts.

Embodiment 2

Figure 3:
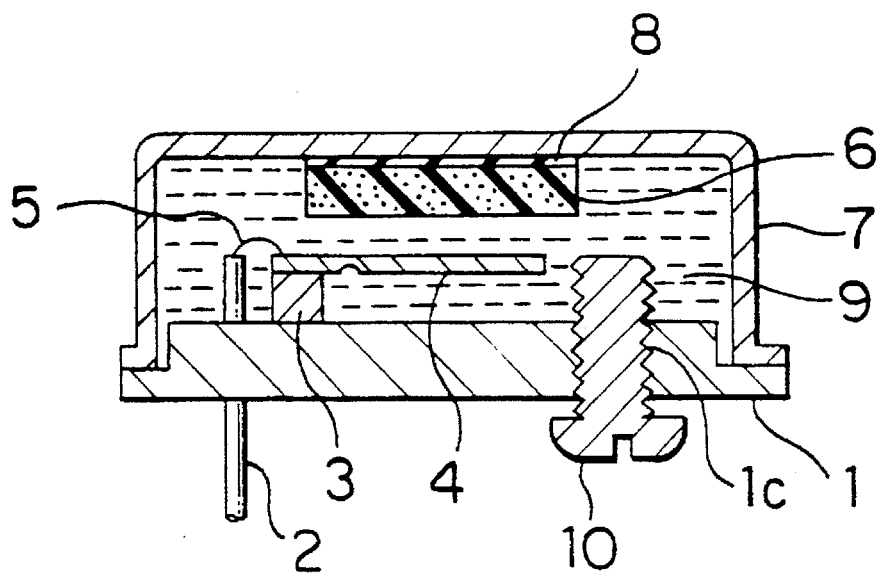
FIG. 3 shows a lateral cross section of a semiconductor acceleration sensor in accordance with a preferred embodiment of the present invention.

FIG. 3 shows a lateral cross section of a semiconductor acceleration sensor in accordance with a second preferred embodiment of the present invention. In this figure, a screw hole 1c is present in the base 1 of the semiconductor acceleration sensor, and a screw 10 is arranged in the screw hole 1c. Turning this screw 10 enables increasing the pressure of the silicone oil 9 within the package space to a higher pressure than normal. Thereby, the generation of air bubbles is prevented in the same manner as in the first embodiment.

Embodiment 3

Figure 4:
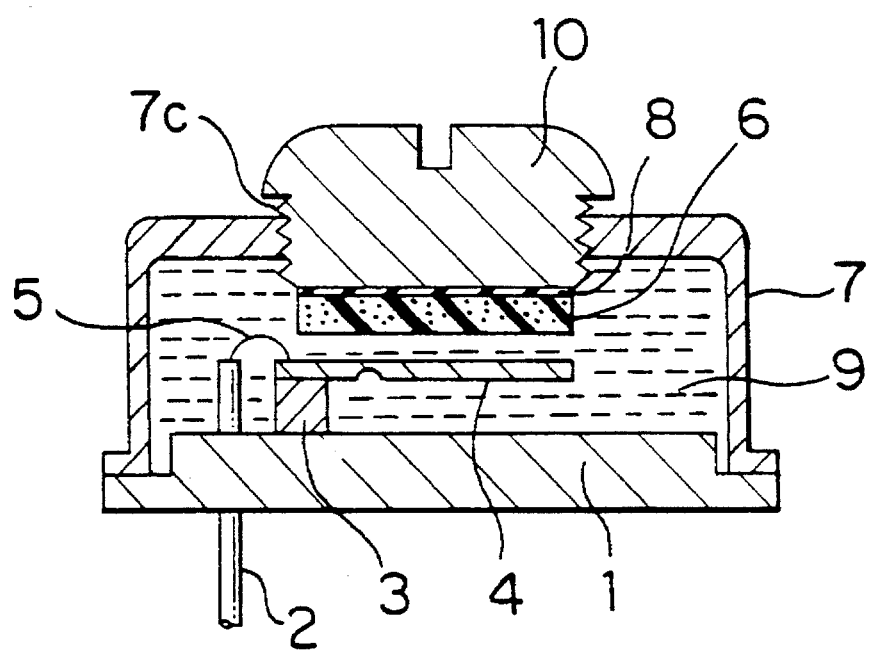
FIG. 4 shows a lateral cross section of a semiconductor acceleration sensor in accordance with a preferred embodiment of the present invention.

FIG. 4 shows a lateral cross section of a semiconductor acceleration sensor in accordance with a third preferred embodiment of the present invention. In this figure, a screw hole 7c is arranged on the central portion of the cap 7 of the semiconductor acceleration sensor, and a screw 10 is arranged into this screw hole 7c. A sponge 6 is attached to the bottom of the screw 10 with an adhesive 8.

Turning this screw 10 enables the pressure of the silicone oil 9 within the package space to be increased to a pressure higher than normal. Thereby, the generation of air bubbles is prevented in the same manner as in the first embodiment.

The arrangement of the sponge 6 on the bottom of the screw 10 makes the adhesion of the sponge 6 easy and also helps enlarge the cross section of the screw 10. Consequently, turning the screw 10 slightly enables adjustment of the pressure in an easy manner.

While the screw 10 may be positioned in either or both of the base 1 and the cap 7 as mentioned above, it may also be positioned in the side of the cap 7. More than one screw may be employed.

Embodiment 4

Figure 5:
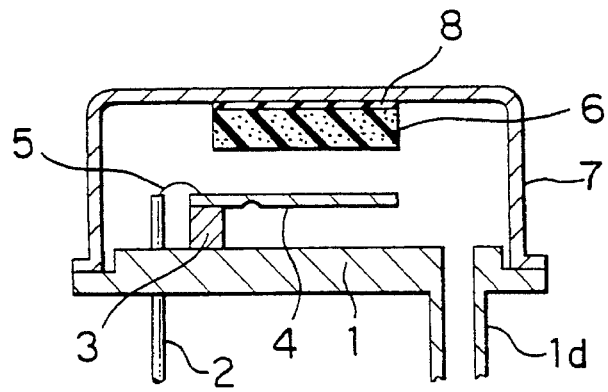
FIG. 5 shows a lateral cross section of a semiconductor acceleration sensor in accordance with a preferred embodiment of the present invention.
Figure 6:
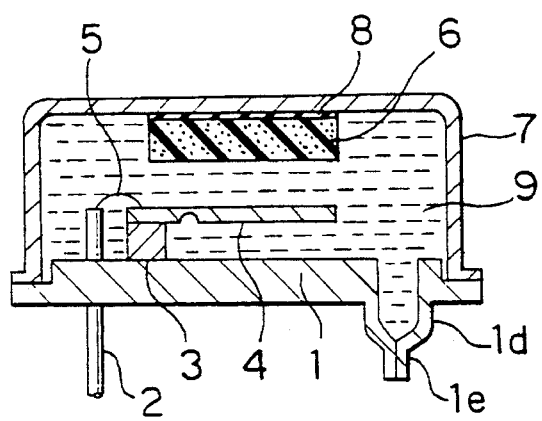
FIG. 6 is a lateral cross section showing the semiconductor acceleration sensor of FIG. 5 filled with silicone oil and having a closed its through hole.
Figure 7:
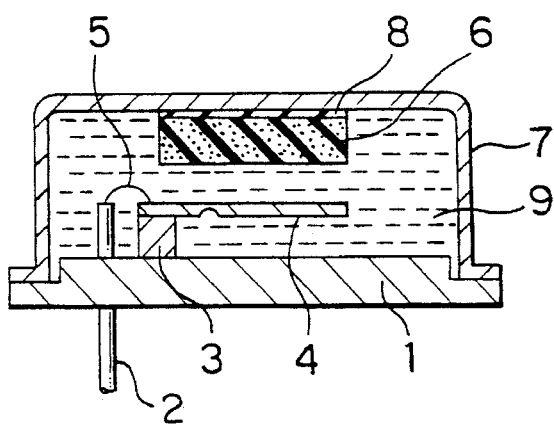
FIG. 7 shows a lateral cross section of a conventional semiconductor acceleration sensor.

FIG. 5 shows a lateral cross section of a semiconductor acceleration sensor in accordance with a preferred fourth embodiment of under the present invention, while FIG. 6 is a lateral cross section showing the semiconductor acceleration sensor of FIG. 5 filled with silicone oil and closed at its through hole. In the embodiments described heretofore, the manner of making the pressure of the silicone oil introduced at normal pressure a higher than normal pressure has been explained. However, the following method also may be employed to make the pressure of silicone oil higher than ordinary pressure.

As shown in FIG. 5, the base 1 and the cap 7 are connected with each other by means of projection welding and then are put into a vacuum container (not illustrated). Next, air is exhausted through the through hole 1d arranged on the package base 1 from the space between the base 1 and 4 cap 7 to evacuate the inside of the package. Then, this through hole 1d is dipped in the silicone oil 9, and the pressure inside of the vacuum container is made higher than normal pressure. Thereby, the pressure of the silicone oil 9 within the package space is made higher than normal pressure, and finally the end of the through hole 1d is closed or sealed (FIG. 6). In this manner, a semiconductor acceleration sensor with a higher silicone oil pressure within the package space than normal pressure is obtained. Accordingly, the generation of air bubbles is prevented in the same manner as in the first embodiment.

The through hole 1d mentioned above may be realized easily by deforming the conventional base 1 slightly. There are ordinarily eight external terminals 2, four of which may be unused. In this case, one of the external terminals 2 may be replaced by a hollow circular cylinder instead of the through hole 1d.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A semiconductor acceleration sensor comprising:

a semiconductor acceleration sensor element having a thin portion;

a pedestal supporting an end of said semiconductor acceleration sensor element, said sensor element being cantilevered;

a base supporting said pedestal;

a cap mounted on said base, covering said semiconductor acceleration sensor element and said pedestal, and forming an airtight space between said cap and said base;

oil filling the airtight space at a higher pressure than atmospheric pressure; and a pressure cushioning material located within said space.

2. The semiconductor acceleration sensor according to claim 1 wherein said cap is concave whereby the pressure of said oil is higher than atmospheric pressure.

3. The semiconductor acceleration sensor according to claim 2 wherein said cap includes a wall having an annular region, the wall having a first thickness except in the annular region which is thinner than the first thickness.

4. The semiconductor acceleration sensor according to claim 1 including a screw threadedly engaging a hole in one of said base and said cap for increasing the pressure of said oil by turning of said screw.

5. The semiconductor acceleration sensor according to claim 4 wherein said pressure sensor cushioning material is mounted on said screw.

* * * * *

UNITED STATES PATENT AND TRADEMARK OFFICE
CERTIFICATE OF CORRECTION

PATENT NO. : 5,567,878
DATED : October 22, 1996
INVENTOR(S) : Kobayashi

It is certified that error appears in the above-indentified patent and that said Letters Patent is hereby corrected as shown below:

Column 4, Line 52, delete --whereby the pressure of--;

Line 53, delete in its entirety.

Signed and Sealed this

First Day of April, 1997

Attest:

BRUCE LEHMAN

Attesting Officer

Commissioner of Patents and Trademarks